INVENTORS
EMIL J. POPA
DENNIS L. OTTO

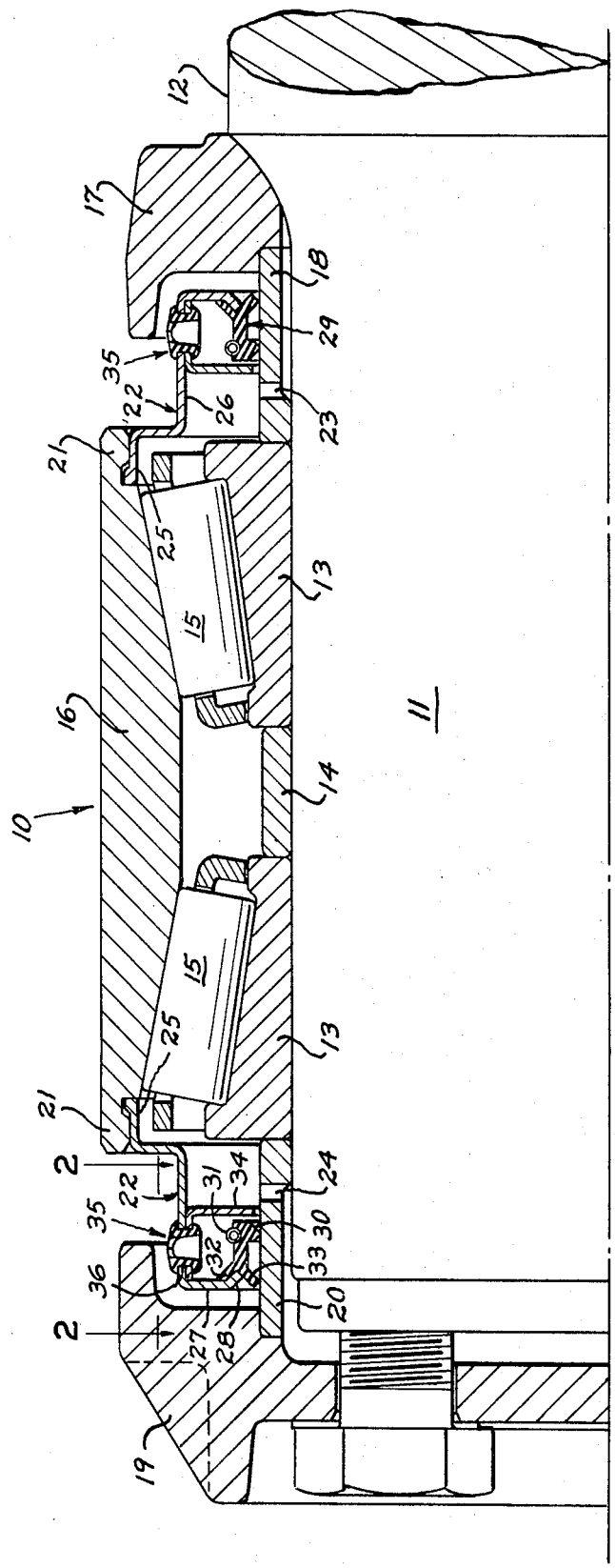
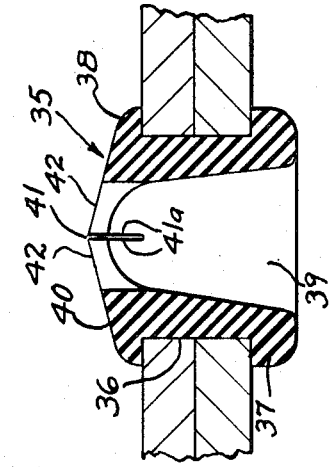
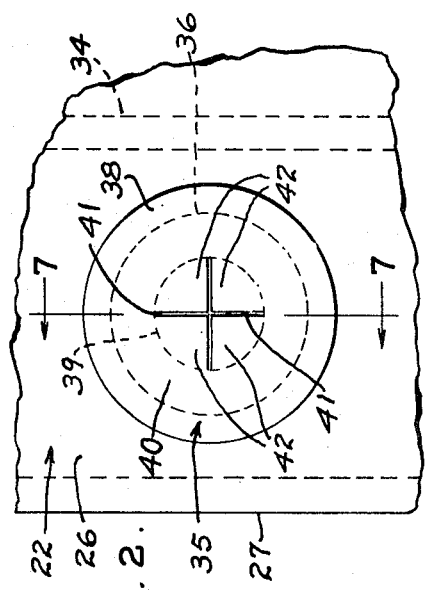
INVENTORS
**EMIL J. POPA
DENNIS L. OTTO**
BY
ATTORNEYS

March 23, 1971 E. J. POPA ET AL 3,572,379
BEARING VENT CONSTRUCTION AND PROCESS OF
MANUFACTURING THE SAME
Filed Feb. 19, 1969 3 Sheets-Sheet 3

INVENTOR:
EMIL J. POPA
DENNIS L. OTTO
BY
Gravely, Lieder & Woodruff
ATTORNEYS

United States Patent Office 3,572,379
Patented Mar. 23, 1971

3,572,379
BEARING VENT CONSTRUCTION AND PROCESS OF MANUFACTURING THE SAME
Emil J. Popa and Dennis Lee Otto, Canton, Ohio, assignors to The Timken Company, Canton, Ohio
Continuation-in-part of application Ser. No. 592,612, Nov. 7, 1966. This application Feb. 19, 1969, Ser. No. 814,872
Int. Cl. F16k *15/00;* F16c *33/78*
U.S. Cl. 137—525.1                                15 Claims

ABSTRACT OF THE DISCLOSURE

A railway car bearing vent formed from a moldable elastomeric material and having a membrane through which a hot knife is passed to form slits therein. The hot knife overcures the material in contact with it so that the edges of the slits will not rebond during operation. Thus, pressure changes in the bearing during and after operation are relieved without allowing the entry of foreign matter into the bearing or without interfering with proper lubrication of the bearing assembly.

---

This application is a continuation-in-part of our copending application Ser. No. 592,612, filed Nov. 7, 1966 and now abandoned.

This invention relates to improvements in vent constructions and particularly to vents for bearings.

Heretofore, various devices have been suggested for relieving internal pressures that develop in bearing assemblies due to temperature changes and to forced lubrication maintenance. Such devices are complicated, require special mounting means, are located in special mountings, and have been expensive to manufacture and have been expensive to manufacture and install. The present improvement overcomes the undesirable characteristics and features of the known devices and has as a primary purpose and object the prevention of build-up pressure to such an extent that damage can be caused to the bearing seals.

Another object of this invention is to provide a vent that can be disposed adjacent to the protective retainer for the usual bearing seal so that a greater volume of air can be vented from the seal location.

Yet another object of this invention is to provide a simple seal vent for anti-friction railway bearings that can be located in close proximity to the bearing seals to thereby reduce the operating pressure on the seals and extend the useful life of the seals.

Still another object of this invention is to provide a vent and seal construction which can be preassembled and easily installed or removed without damage.

A further object of this invention is to provide a vent for a bearing seal that will be adaptable to mounting in any one of several locations adjacent the seal to control pressure build-up against the seal and to relieve the bearing of excessive lubricant upon relubrication.

Still a further object of this invention is to provide a vent device for a sealed bearing that will function to prevent development of a partial vacuum in the bearing and, hence, prevent ingress of dirt and water through the seals as well as minimize dirt and water passage through the vent device.

Yet another object of this invention is to provide a novel vent device having apertures of permanently open character so that very little motion is obtained upon venting action thereof.

An additional object is to provide a vent which can be easily installed in conventional backing rings.

Another object is to provide a vent having partially separated flexible segments which are formed from a partially cured elastomeric material, yet will not rebond together.

Still another object is to provide a process for manufacturing vents of the type stated.

Other objects and advantages of the present invention reside in the parts and components hereinafter set forth in the following description of certain preferred embodiments of bearing vent constructions and a process for manufacturing the same. More specifically, the constructions include a bearing assembly having a passageway through which the internal portions of the bearing are vented. The passageway is normally closed by a wall formed from a flexible material and having slits which permit the wall to flex and vent the interior portions of the bearing assembly. The material at the edges of the slits is overcured to prevent rebonding of the material.

In the accompanying drawings which form part of the specification and wherein like numerals and letters refer to like parts wherever they occur:

FIG. 1 is a longitudinal sectional elevation of one-half of an anti-friction axle bearing assembly equipped with one form of seal case and vent of this invention;

FIG. 2 is a fragmentary plan view of a seal case showing the vent grommet mounted therein, the same being seen at line 2—2 in FIG. 1;

FIG. 7 is a greatly enlarged sectional view taken at line 7—7 of the vent grommet of FIG. 2;

Figure 3:
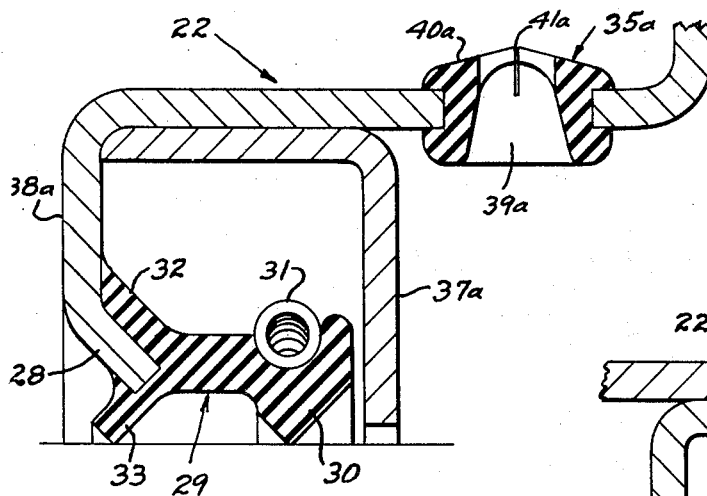
FIG. 3 is a fragmentary sectional elevational view of a seal case and vent grommet showing a mounting arrangement alternate to that of FIG. 1.

In FIG. 1 the anti-friction roller bearing assembly 10 is mounted on the journal 11 of a railway car truck axle 12. The bearing assembly includes cones 13 spaced by the ring 14. Tapered rollers 15 are mounted on the cone raceways and are enclosed by a cup 16 having raceways for the rollers 15. A backing ring 17 and a spacer 18 locate the cones 13, and the cones are secured in position on the journal 11, by an end cap 19 and spacer 20. In the assembly the cup 16 is formed with axially projecting lips 21 having internal surfaces for mounting seal case members 22 which cooperate with the spacer rings 18 and 20 outwardly of the usual lubricant passages 23 and 24 respectively formed in such rings. Thus, lubricant introduced in the usual manner (not shown) at end cap 19 passes around the outer end of the axle 12, through passage 24 inwardly of the adjacent seal case 22, around the rollers 15 within the cup 16 and toward the opposite seal case 22.

As shown in FIG. 1, the outer seal case 22 has an enlarged annular and axially directed lip 25 which seats in the cup lip 21. The case 22 has a cylindrical body portion 26 of lesser diameter than lip 25 and a radial end wall 27 which is formed with a lip 28 to which is secured (by bonding methods) a resilient seal member 29. The seal 29 has a main seal lip 30 held in working relation on the spacer 20 by a garter spring 31. Seal 29 has its base split into legs 32 and 33 which are secured to the lip 28, leg 33 also acting as an auxiliary seal engaged on the spacer 20. The seal 29 is protected by a retainer member 34 which is fitted into the case body portions 26 so that its radially directed wall forms a chamber for the spring 31. The inner seal case 22 is identically formed and constructed and like reference numerals have been applied to simplify this description.

Referring to FIGS. 1 and 2, it can be seen that each seal case 22 is provided with a vent grommet 35 formed of a synthetic elastomer type material which is inert to lubricants and substances normally encountered in service. The vent grommet 35 has a cylindrical body which is tightly fitted into an aperture 36 formed through the case wall 26 and the retainer member 34. An inner flange 37 and an outer flange 38 provide a tight grip on the adjacent surfaces of the seal case body and retainer member so that no leak passage can develop to by-pass the central passage 39 in the grommet 35. The outer end of the grommet has a conically shaped wall 40 in which slits 41 are formed in crossed relation. The conical configuration of the wall 40 renders the wall more easily yieldable in one direction than in the opposite direction, and in the grommet shown the more yieldable is outward relative to the chamber within the seal case 22. Thus, venting is accomplished by the air or lubricant in the chamber passing outwardly of the seal case 22 while dirt and water are sealed out by the non-yielding reaction of the segments (FIG. 2) 42 of the wall 40.

In FIG. 3 there is shown an alternate arrangement of vent grommet 35A for the seal case 22. The component of vent grommet 35A for the seal case 22. The components of the seal 29 and seal case 22 are identical with those described in connection with FIG. 1 and the same reference numerals are applied thereto. However, the vent grommet 35A is sized to tightly grip the single wall thickness of the case 22 between the inner flange 37a and the outer flange 38a. The central passage 39a has an outer wall 40a of conical shape and crossed slits 41a are formed in such wall 40a so that the yielding thereof is outward relative to the passage 39a. In this arrangement the vent grommet 35A is located outside the chamber on the lubricant side of the seal case so that more air venting action occurs to reduce the operating pressure of the seal and to purge lubricant more readily.

Figure 4:
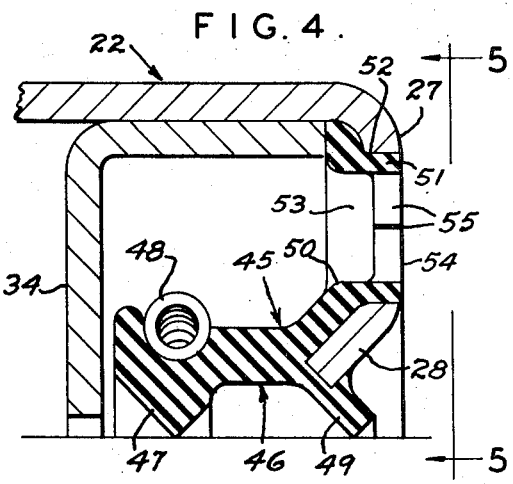
FIG. 4 is a fragmentary sectional elevational view showing a unitary form of seal and vent.
Figure 5:
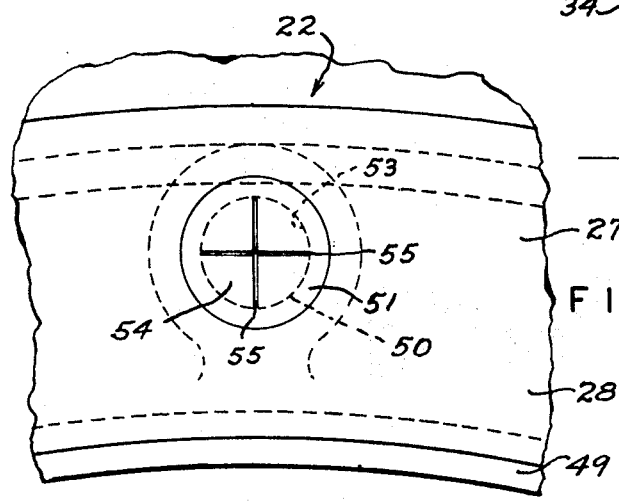
FIG. 5 is a view taken at line 5—5 in FIG. 4.

The modification shown in FIGS. 4 and 5 is of a combined seal and vent grommet 45 which is mounted in the outer radial wall 27 of the seal case 22. The seal body 46 has its principal seal lip 47 held in working position by a garter spring 48, and its auxiliary seal lip 49 held by the lip 28 of the seal case. The vent grommet portion 50 has a cylindrical part 51 tightly seated in an aperture 52 in the wall 27, and the passage 53 terminates at the outer flat wall 54 in which crossed slits 55 are formed to produce four flexible segments that as easily yield inwardly as outwardly relative to the seal case chamber within the retainer wall 34. In this modification, the seal and grommet 45 are molded as a unit which results in a less expensive device and one that can be attached quite readily. Of course, the reversibly venting segments shown at 55 can be replaced with the unidirectional type segments 42 shown in FIG. 1.

Figure 6:
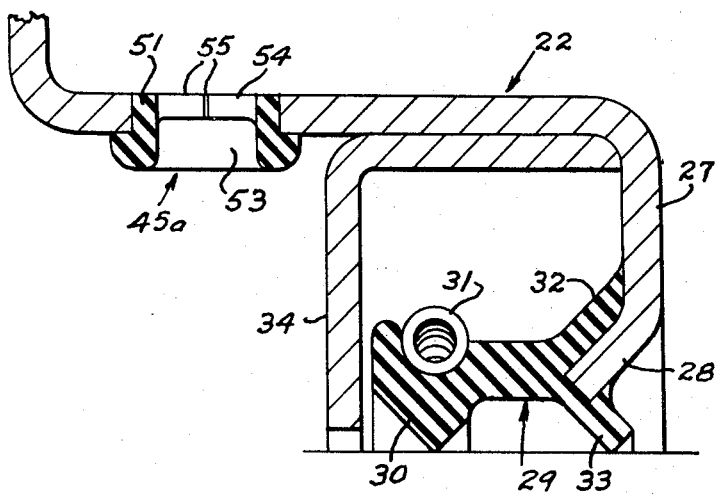
FIG. 6 is a view similar to FIG. 4, but showing a modification thereof.
Figure 8:
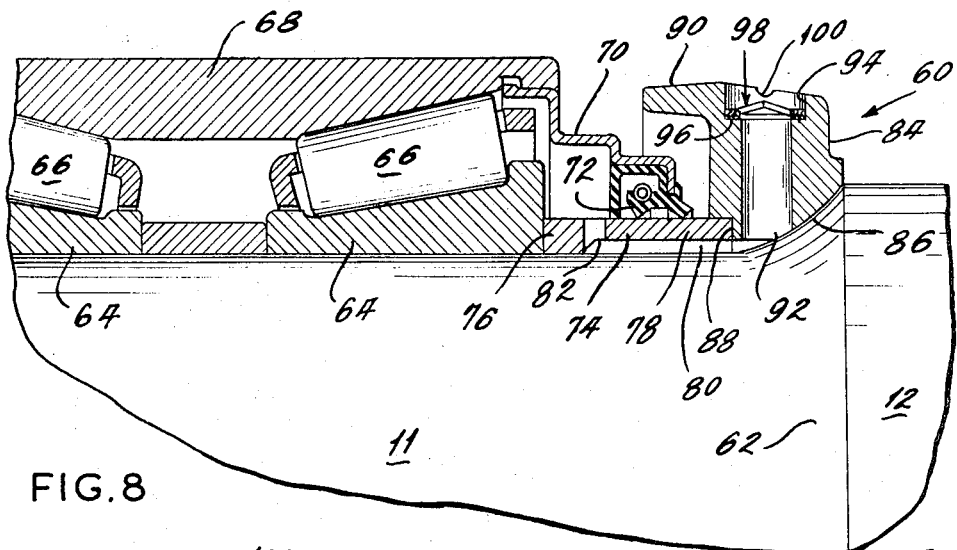
FIG. 8 is a sectional view of a conventional bearing having a backing ring provided with a vent construction constructed in accordance with the present invention.
Figure 9:
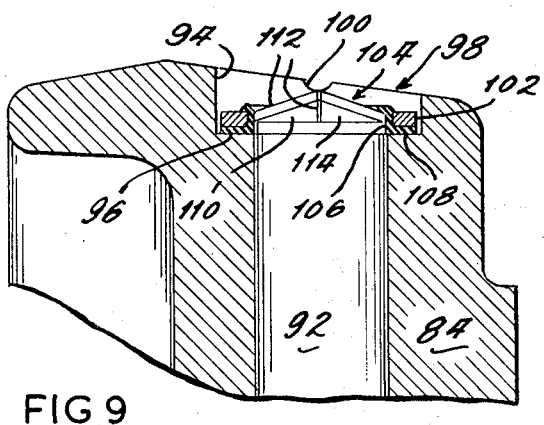
FIG. 9 is an enlarged sectional view of the vent construction of FIG. 8.

The modification seen in FIG. 6 embodies a seal case 22 in which the seal body 29 is carried by lip 28 and is enclosed in the chamber limited by retainer wall 34. The vent grommet 45A is separately formed but is otherwise similar to the vent grommet 45. In this case, the vent grommet 45A is securely mounted outside the seal chamber but adjacent retainer wall 34 in the seal case 22, in the manner of the unidirectional vent grommet of FIG. 3.

For purposes of showing a manufacturing technique for the present vent grommets, FIG. 7 is an enlargement of vent grommet 35. It could also be of the type seen at 45 or 45A. In either form, the synthetic elastomer material is molded with the membrane or wall 40, and at the desired time in the production sequence, a hot slitting knife is applied to the wall 40 to cause the forming of the crossed slits 41.

It can now be appreciated that the vent grommet of this invention can be made as a unidirectional or bidirectional vent, by respectively shaping the membrane wall in a convex (outwardly) or cone configuration, or in a flat configuration. When conically shaped, the vent segments close when a partial vacuum exists in the seal chamber or inside the bearing assembly, and when flat, the vent segments flutter in either direction. In all cases, the grommet fits tightly in its mounting aperture and cannot vibrate loose. The unidirectional vent grommet 35 allows air and lubricant to escape from the bearing assembly and prevents air, dirt, or water from entering, and will allow a partial vacuum to be obtained in the bearing during cooling thereof after operation. It is advantageous to mount the vent grommet on the chamber side of the spring retainer wall 34 (FIG. 1) to enable venting action with a differential pressure across the spring retainer wall 34. When the slits are permanently open, the wall segments do not move to open for the passage of air.

Referring now to FIGS. 8-13, it is possible to utilize the foregoing vent construction in conventional bearing assemblies 60, either as replacements for conventional vents supplied therewith or as original equipment. Like the bearing assembly 10, each bearing assembly 60 is mounted on the journal 11 of a car axle 12 having an arcuate shoulder 62 at the inner end of the journal 11. The bearing assembly 60 includes cones 64, tapered rollers 66, and a cup 68. At its ends the cup 68 is fitted with seal cases 70 to which elastomeric seals 72 are bonded. The seals 72 engage spacer rings 74 having end portions 76 which embrace the journal 11 adjacent to the cones 64 and wear portions 78 which are located outwardly from the surface of the journal 11 so as to form a thin annular cavity 80. Each spacer ring 74 at the juncture of its wear portion 78 and end portion 76 is provided with a radial passage 82 for establishing communication between the cavity 80 and that portion of the bearing assembly 60 circumscribed by the adjacent seal case 70. The wear portion 78 on the inboard spacer ring 74 projects axially toward the arcuate shoulder 62, and interposed between the two is a backing ring 84 having an arcuate inner face 86 which abuts against the arcuate surface of the shoulder 62. Beyond the arcuate face 86 the inwardly presented surface of the backing ring 84 is located in spaced relation to the surface of the journal 11, forming a continuation of the cavity 80. The ring 84 is furthermore provided with an annular recess 88 for reception of the free end of the adjacent wear portion 78 so as to seal the cavity 80 at the juncture of the inboard spacer ring 74 and the backing ring 84. The ring 84 also includes a lip 90 which projects outwardly across a portion of the inboard seal case 70. Finally, the backing ring 84 has a radial vent bore 92 which communicates with the annular cavity 80 at its inner end and at its outer end opens into an outwardly opening counterbore 94 at a shoulder 96 in the formation of a vent passageway through the backing ring 84. Fitted into the counterbore 94 against the shoulder 96 is a vent fitting 98 which is staked in place at depressions 100 located adjacent to the outer margin of the counterbore 96. Accordingly, the interior of the bearing assembly 60 is vented through the radial passage 82, the annular cavity 80, the vent bore 92, and the vent fitting 98.

Figure 11:
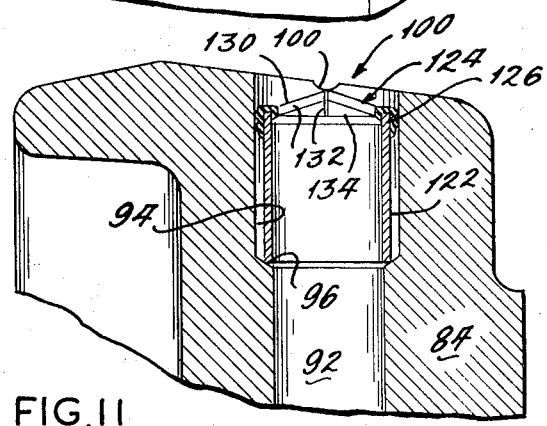
FIG. 11 is a sectional view of a modified vent construction in a similar conventional backing ring.
Figure 10:
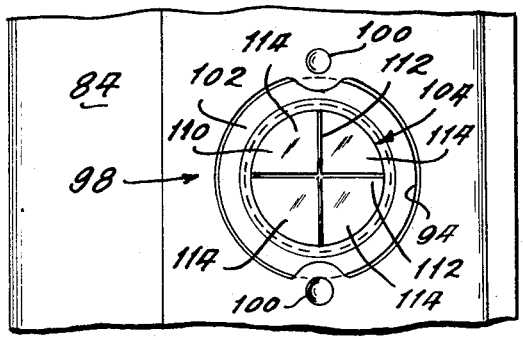
FIG. 10 is a plan view of the vent construction of FIGS. 8 and 9.
Figure 12:
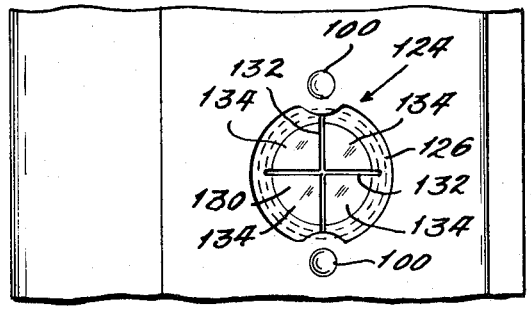
FIG. 12 is a plan view of the vent construction of FIG. 11.
Figure 13:
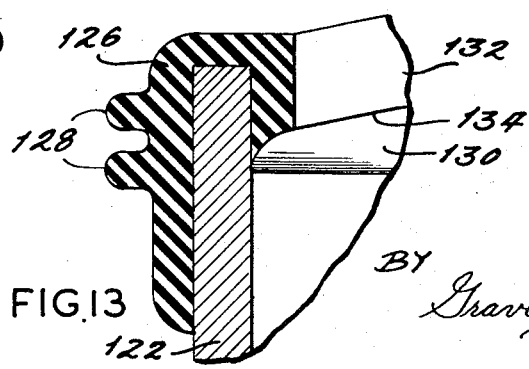
FIG. 13 is a fragmentary sectional view of the vent construction of FIGS. 11 and 12 showing the sealing ribs unrestrained.

The vent fitting 98 (FIGS. 9 and 10) includes a flat rigid seal ring 102 formed preferably from steel, and bonded to the ring is a flexible sealing grommet 104 which is preferably molded from an oil resistant synthetic polymer. More specifically, the grommet 104 has an annular rim 106 which is bonded to the inwardly presented cylindrical surface of the ring 102 and merges at one end into an outwardly directed sealing flange 108 which extends across and is bonded to one of the flat faces of the ring 102. The sealing flange 108 rests on the shoulder 96, forming a fluid-tight static seal therewith, and the staking formed by the depressions 100 overlies the other flat surface of the ring 102, holding the fitting 98 in the counterbore 94. At that end of the ring 102 the rim 106 is flashed over the outwardly presented annular edge thereof to prevent separation of the bond at the rim 106 in service. The rim 106 merges into and supports an integrally formed conical wall 110 having cross slits 112 which form outwardly yieldable segments 114 thereon. The wall 110 and segments 114 serve the same function as the wall 40 and segments 42 of the vent grommet 35, only they relieve the internal bearing pressure through passage 82, cavity 80, and vent bore 92, instead of directly through the seal case.

Where the counterbore 94 is of extended length, as illustrated in FIGS. 11–13, a modified vent fitting 120 is fitted therein. The vent fitting 120 includes a sleeve 122 which fits loosely into the counterbore 94, its lower margin engaging the shoulder 96, and attached to the sleeve 122 adjacent to the outer surface of the backing ring 84 is a grommet 124 having a rim 126 which is bonded to and completely overlaps both the inner and outer cylindrical surfaces of the sleeve 122. The rim 126 is provided with a pair of annular ribs 128 (FIG. 13) which engage and are compressed against the wall of the counterbore 94 to form a fluid-tight static seal therewith. On its opposite side the rim 126 merges into an outwardly extending conical wall 130 having cross slits 132 which define outwardly yieldable segments 134. The staking formed by the depressions 100 overlies the rim 126 and prevents removal of the vent fitting 120 from the counterbore 94. The walls 130 and yieldable segments 134 function similar to their counterparts on the vent grommet 34 and vent fitting 98.

As previously noted, the vent grommets 35, 35A, 45, 45A, 104 and 124 are formed from a flexible elastomeric material which is inert to lubricants and other substances normally encountered in rail car bearing service. Moreover, each of the vent grommets 35, 35A, 45, 45A, 104 and 124 have walls which traverse some kind of opening or pressure relief passageway, and each of those walls is provided with cross slits so as to form segments which yield in the presence of correctly oriented pressure induced forces.

After the grommets are molded from a suitable elastomeric substance, they are cured to a level of at least 50%, that is, until 50% of the possible cross linking between the long chain molecules of the elastomer has occurred. Preferably the grommets are cured to a level of 90 to 95 percent. The precise time and temperature conditions necessary to bring a particular elastomer to a desired level of cure may be ascertained by subjecting the raw elastomer to destructive tests in an oscillating disc rheometer. Thereafter, a hot knife is passed through the grommet in question to form the slits therein. The temperature of the knife and the length of time it remains in contact with the elastomer of the wall are all such that the elastomeric material is immediate contact with the surface of the knife is overcured, that is, it is cured to the extent that no further cross linking between the long chain molecules of the elastomer can occur absent the introduction of an additional constituent into the system. When the elastomer reaches the condition or level of cure where no further cross linking between the long chain molecules will occur it is considered to be fully cured. In other words, the term fully cured means the exact point or level of cure where no further cross linking of the long chain molecules will take place. The cure level of the portions of the wall outwardly from or beyond the slits will remain substantially unchanged due to the insulating properties of the elastomer. When the knife is removed, the portion of the elastomeric material previously in contact with it forms the edges of the slits, and since the material at the slits is overcured, those edges are hard and inelastic in comparison to the remaining portions of the wall which have not reached such a level of cure. Moreover, the overcure at the slits prevents the elastomeric material from bonding together across the slits, even after long periods of contact at high temperatures. Consequently, the individual wall segments will remain free to flex outwardly and relieve high internal pressures. The knife must be thin enough to prevent the overcured edges of the slit from remaining apart after it is removed, yet it must have sufficient mass to conduct enough heat into the polymer to achieve the overcure. For walls having a radius between 0.4 and 0.6 inch and thicknesses between 0.03 and 0.05 inch, a stainless steel blade 0.020–0.050 inch thick is suitable for forming the slits. Subsequently, the grommet may be post cured in an oven to raise its cure level above 95 percent, or it may be placed in a seal case or backing ring, on which further curing would occur during operation.

Generally speaking, any elastomeric substance which is inert to lubricants and reasonably flexible may be used for the grommets and this includes the elastomers from which conventional seal rings are molded. A copolymer of 50 to 80 percent butadiene and 20 to 50 percent acrylonitrile, generally known as nitrile rubber, is highly resistant to oils and grease and is particularly suitable for use in molding the grommets of the present invention. Nitrile rubber is molded at 275° to 400° F. and may be subsequently cured while still in the mold to the 90 to 95 percent cure level from 1½ to 15 minutes at 275° to 400° F. The exact time and temperature conditions within the foregoing ranges for bringing various nitrile rubber compositions to any desred cure level can be determined by subjectnig raw, that is uncured, test specimens to destructive tests in an oscillating disc rheometer. Acrylate and silicone polymer families are also highly suitable for molding the grommets.

For most polymers, the hot knife should be maintained at approximately 100° to 300° F. above the maximum molding temperature for the elastomer and it should remain within the grommet between one and 60 seconds. Again, the exact temperature of the hot knife and the time it should remain in contact with the elastomer is dependent on the particular composition employed, and these conditions may be ascertained through tests with an oscillating disc rheometer.

Once the hot knife has been withdrawn from the grommet, the grommet is ready for service in one of the vent constructions. It is not practical to mold cure nitrile rubber or most other elastomers beyond the 90 to 95 percent range inasmuch as the elastomers must be held near the maximum allowable temperatures for extended periods of time. This is difficult to achieve without inducing scorch or overcure which destroys the elastic properties of the elastomer. Furthermore, the maximum allowable temperature varies slightly from batch to batch, making the problem even more difficult.

In lieu of curing the elastomer to 90 to 95 percent or for that matter, any other desired level before slitting with a hot knife, the elastomer may be cured to a lesser level, then slit and overcured at the edges of the slit, and finally post cured to the desired level for service, that level preferably being between 90 and 95 percent. Again, the knife must be hot enough to overcure the elastomer so it will not rebond across the slits during the post cure.

This invention is intended to cover all changes and modifications of the example of the invention herein chosen for purposes of the disclosure which do not constitute departures from the spirit and scope of the invention.

What is claimed is:

1. A vent construction for disposition in a passageway leading from a space to be vented; said vent construction comprising a flexible wall extending generally across and normally closing the passageway, the wall having at least one slit extending completely through it and dividing it into flexible segments provided with adjacent and engageable edges at the slit, the segments flexing when the wall is subjected to forces acting in at least one direction longitudinally of the passageway and causing the edges to spread apart and thereby enlarge the slit so that pressures on both sides of the wall tend to equalize, the wall segments being formed from an elastomeric material which for the most part is less than fully cured so that the segments will easily flex when subjected to properly oriented forces, the elastomeric material being at least fully cured at the engageable edges so that when the wall segments are engaged at the slit the elastomeric material will not rebound across the slit and prevent the slit from enlarging.

2. A vent construction according to claim 1 wherein the elastomeric material remains substantially stable dimensionally when heated.

3. A vent construction according to claim 2 wherein the segments flex in at least one direction longitudinally of the passageway when the flexible wall is subjected to properly oriented forces.

4. A vent construction according to claim 3 wherein the flexible segments are presented at an angle with respect to the centerline of the passageway whereby they will flex away from their closed position in one direction longitudinal to the passageway, but not in the other direction.

5. A vent construction according to claim 3 wherein the flexible wall is generally conical with its apex directed outwardly.

6. A vent construction according to claim 1 wherein the slit is formed by a knife inserted through the flexible wall, the knife being hot enough and remaining in contact with the wall a sufficient amount of time to at least fully cure the elastomeric material of the wall at the slit.

7. A vent construction according to claim 1 wherein the flexible wall is provided with two intersecting slits which divide the wall into four flexible segments.

8. A vent construction according to claim 1 wherein the elastomeric material of the flexible wall, other than that at the slit, is cured to a level of at least 50%.

9. A vent construction according to claim 1 wherein the passageway is located in a structure which encloses a space to be vented, and wherein a rim-like segment surrounds the flexible wall and is formed integral therewith, the rim-like segment being mounted rigid with respect to the enclosing structure in which the passageway is disposed.

10. A vent construction according to claim 9 wherein the rim-like segment is bonded to a rigid member which is disposed within the passageway.

11. A vent construction according to claim 10 wherein the structure enclosing the space to be vented is part of a bearing assembly and includes a backing ring, wherein the passageway comprises a bore and counterbore in the backing ring, the counterbore opening outwardly of the backing ring at its one end and opening into the bore at a shoulder at its opposite end, and wherein the vent construction is disposed within the counterbore.

12. A vent construction according to claim 11 wherein the rigid member is a generally flat ring having an inwardly presented curved surface and flat faces extending away from the curved surface, wherein the rim-like member is bonded to the inwardly presented curved surface of the ring and integrally includes a flange bonded to one of the flat faces of the ring, and wherein the flange engages the shoulder and forms a static seal therewith.

13. A vent construction according to claim 11 wherein the rigid member is a sleeve in the counterbore, and wherein the rim-like member is bonded to one end of the sleeve and engages the cylindrical surface of the counterbore, forming a static seal therewith.

14. A vent construction according to claim 1 wherein the passageway is an aperture disposed in a bearing seal case.

15. A vent construction according to claim 14 wherein the flexible wall forms part of a grommet having inner and outer flanges which overlie the seal case in surrounding relation to the aperture.

References Cited

UNITED STATES PATENTS

| | | | |
|---|---|---|---|
| 2,115,122 | 4/1938 | Prudden | 264—154X |
| 2,748,863 | 6/1956 | Benton | 264—154X |
| 2,830,832 | 4/1958 | Moorman | 277—29 |
| 2,907,341 | 10/1959 | Boyer et al. | 137—525.1X |
| 2,944,580 | 7/1960 | Nece | 137—525.1X |
| 2,973,230 | 2/1961 | Eastburg | 137—525.1X |
| 3,092,439 | 6/1963 | Harrison | 264—154 |
| 3,369,666 | 2/1968 | Hultgren et al. | 137—525.1X |
| 3,443,000 | 5/1969 | Travis | 264—154 |

FOREIGN PATENTS

| | | | |
|---|---|---|---|
| 937,243 | 9/1963 | Great Britain | 137—525.1 |

LAVERNE D. GEIGER, Primary Examiner

D. J. ZOBKIW, Assistant Examiner

U.S. Cl. X.R.

29—156, 470; 83—171; 277—29, 71; 264—154; 308—187